United States Patent Office 3,162,698
Patented Dec. 22, 1964

3,162,698
THERMOPLASTIC COMPOSITIONS HAVING IMPROVED STRESS CRACKING PROPERTIES
Bernard O. Baum, Plainfield, N.J., assignor to Union Carbide Corporation, a corporation of New York
No Drawing. Filed June 19, 1962, Ser. No. 203,472
9 Claims. (Cl. 260—897)

The invention relates to mixtures of olefin high polymers and ethylene/bicycloheptene and/or ethylene/bicycloheptadiene copolymers. In a particular aspect, the invention relates to mixtures of olefin high polymers and ethylene/bicycloheptene and/or ethylene/bicycloheptadiene copolymers which exhibit superior stress crack resistance compared with olefin high polymers alone.

Olefin high polymers, especially olefin high homopolymers and copolymers derived from monoolefinically unsaturated monomers, "monoolefins," have such poor stress crack resistance that they are rendered virtually useless for a great number of applications for which they otherwise would be well suited because of the proximity of a chemically active material.

It has now been discovered that surprising and marked improvement in the stress crack resistance of olefin high polymers can be obtained by the mixing therewith to substantial homogeneity, i.e., to the formation of an intimate admixture, certain amounts of an ethylene/bicycloheptene copolymer or an ethylene/bicycloheptadiene polymer or a mixture thereof. These compositions are useful for making bottles and other containers and molded articles as well as films and coatings, and are particularly advantageous where high stress crack resistance is a desirable or essential feature of the article.

The term "high polymers" is used in the present specification and claims to denote homopolymers of monoolefins containing preferably from 2 to 10 carbon atoms inclusive, copolymers of two or more monoolefins containing from 2 to 10 carbon atoms inclusive and copolymers containing about 80 percent by weight, and preferably at least 90 percent by weight, of one such monoolefin with up to about 20 percent by weight and preferably up to about 10 percent by weight, of at least one other olefinically unsaturated monomer coplymerizable therewith, such as, for example, vinyl esters, vinyl ethers, acrylic acid and methacrylic acid and esters thereof such as ethyl acrylate, methyl methacrylate, and the like, in every case the olefin high polymer being of sufficient molecular weight that it is considered a high polymer rather than a wax, i.e., it has a molecular weight of at least about 10,000, conveniently determined by a melt index of less than about 1,000, and preferably less than about 100. Illustrative of the suitable homopolymers and copolymers which can be used as olefin high polymers to be modified by addition thereto of an ethylene/ bicycloheptene and/or ethylene/bicycloheptadiene copolymer are the normally solid polyethylenes having a density of from about 0.91 to about 0.97 as well as other olefin homopolymers such as polypropylene, polybutene-1, poly(3-methylpentene-1), polyhexene-1, polyoctene-1, polydecene-1, and the like, and olefin copolymers, as for example ethylene/propylene copolymers, ethylene/butene-1 copolymers, ethylene/ethyl acrylate copolymers, ethylene/methyl methacrylate copolymers, ethylene/vinyl acetate copolymers, and the like. This list, however, is intended to be merely illustrative and should not be considered as restrictive of the olefin high polymers which can be used in the compositions of this invention.

The above-described olefin high polymers constitute from about 70 percent by weight to about 99 percent by weight of the olefin high polymer-ethylene/bicycloheptene and/or ethylene/bicycloheptadiene copolymer mixtures of this invention. The preferred amount of olefin high polymer in the mixture is from about 80 percent by weight to about 90 percent by weight.

The olefin high polymer-ethylene/bicycloheptene and/or ethylene/bicycloheptadiene copolymer thus comprises from about 1 percent by weight to about 30 percent by weight ethylene/bicycloheptene or ethylene/bicycloheptadiene copolymer, with an amount of either or a total of these copolymers of from about 10 percent by weight to about 20 percent by weight being preferred.

The ethylene/bicycloheptene or ethylene/bicycloheptadiene copolymers useful as additives to olefin high polymers in this invention contain from about 1 percent by weight to about 30 percent by weight combined bicycloheptene or bicycloheptadiene, and preferably from about 2.5 percent by weight to about 15 percent by weight combined bicycloheptene or bicycloheptadiene and therefore from about 70 percent by weight to about 99 percent by weight, and preferably from about 85 to about 97.5 percent by weight, combined ethylene.

Bicycloheptene and bicycloheptadiene monomers which can be copolymerized with ethylene for use in the invention are bicycloheptenes having the structural formula

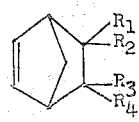

and bicycloheptadienes having the structural formula

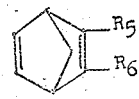

wherein $R_1$ and $R_3$ are members selected from the group consisting of hydrogen or lower alkyl radicals, e.g., those having from 1 to 4 carbon atoms inclusive, and $R_2$, $R_4$, $R_5$ and $R_6$ are members selected from the group consisting of hydrogen, lower alkyl radicals, e.g., those having from 1 to 4 carbon atoms inclusive, or aryl radicals. The preferred bicycloheptene comonomer is bicyclo [2.2.1.]hept-2-ene, and the preferred bicycloheptadiene comonomer is bicyclo [2.2.1]hepta-2, 5-diene.

The ethylene/bicycloheptene and ethylene/bicycloheptadiene copolymers used in this invention are normally solid copolymers having a melt index of less than about 1,000, and preferably less than about 100. Suitable copolymers are prepared by copolymerizing ethylene, bicycloheptene and/or bicycloheptadiene by a free radical process using bulk, solution, emulsion or suspension techniques at pressures about 500 atmospheres, and above and preferably from about 750 to 3,000 atmospheres, at a temperature of from about 40° C. to about 350° C. and preferably from about 125° C. to about 225° C. to obtain a copolymer having the structure given in Examples 17 and 18 hereof. Alternatively suitable copolymers can be obtained by a coordination catalyst such as the product of titanium tetrachloride and lithium aluminum tetraalkyl. These polymers which have the structure

wherein $n$ and $m$ are integers such that the copolymer is normally solid, are described and claimed in U.S. Patent No. 2,799,668 to A. W. Anderson et al., issued July 16, 1957, which is herewith incorporated by reference.

The method in which the olefin high polymerethylene/bicycloheptene and/or ethylene/bicycloheptadiene copolymer blend is prepared is not narrowly critical.

Any conventional method which provides a homogeneous mixture can be employed. One method which has been found to be satisfactory is to flux mixtures of polymers and any desired additives in a Banbury mixer for a three to five minute cycle and then to work the material on a two-roll mill before transferring it into the rolls of a calender mill.

At the time of blending or at any other time additives conventional in thermoplastic technology, including but not limited to, modifiers, opacifiers, fillers, lubricants, stabilizers, colorants, and the like can be added to the compositions of the invention, if desired.

The practice of the present invention is illustrated by the following examples wherein all parts and percentages are by weight unless otherwise specified.

EXAMPLES 1–13

An olefin high polymer was fluxed on a two-roll mill at 110° C. and the ethylene/bicycloheptene or ethylene/bicycloheptadiene copolymer milled in immediately after fluxing. The time of working was about five minutes including ten end passes to disperse to homogeneity the copolymer additive. Control samples were prepared in the same manner except that no copolymer was added.

To determine stress crack resistance, a 125 mil compression molded specimen 0.5″ x 1.5″ was slit along the long dimension. The slit was 20 mils deep and 75 mils long. The speicmen was then bent 180°. Ten such bent specimens were held in a channel which was then immersed in Hostapal (a non-ionic surfactant believed to be similar to nonyl phenoxy polyoxyethylene ethanol) at 50° C. in a test tube. Two such channel devices were put into each tube, providing twenty specimens per test. Time to failure of any one specimen was the appearance of a crack perpendicular to the slit; "$F_{50}$" is the time to failure of 50 percent (i.e., 10) of the specimens.

Melt index was measured at 190° C. and 44 p.s.i. in accordance with ASTM D–1238–57T.

Density was determined in acocrdance with ASTM D–1505–57T.

Results of tests conducted on the olefin high polymer-ethylene/bicycloheptene and ethylene/bicycloheptadiene copolymer mixtures of the invention (Examples 1–13) are summarized in Table I.

copolymers are substituted for low density polyethylene. Similar stress crack improvements are obtained.

EXAMPLE 16

Example 1 is duplicated except that an equal weight mixture of ethylene/bicyclo[2.2.1]hept-2-ene copolymer and ethylene/bicyclo[2.2.1]hepta-2,5-diene copolymer is substituted for ethylene/bicyclo[2.2.1]hept-2-ene copolymer. Similar stress crack improvement is obtained.

EXAMPLE 17

Into a stainless steel-lined stirred autoclave of about 1.5 liter capacity was charged 475 grams benzene, 2 milliliters of a 5 percent by weight solution of di-t-butyl peroxide in benzene, and 19.6 grams of 5-methylbicyclo-[2.2.1]-hept-2-ene. The autoclave was sealed, flushed with ethylene, pressured with ethylene to 2,000 p.s.i.g., and heated to 160° C. with vigorous agitation. The ethylene pressure was then adjusted to 15,000 p.s.i.g. and the polymerization was carried out maintaining the pressure and temperature at about the stated values one hour. After cooling, the autoclave was vented, the solid ethylene/5-methylbicyclo-[2.2.1]hept-2-ene copolymer was filtered, washed with methanol, and dried. The copolymer was a white, granular resin.

The infrared spectrum was consistent with an ethylene/5-methylbicyclo[2.2.1]hept-2-ene copolymer having the structural formula

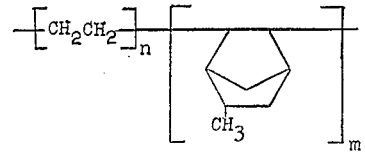

EXAMPLE 18

The procedure of Example 17 was followed except that for 5-methylbicyclo[2.2.1]hept-2-ene was substituted bicyclo[2.2.1]hepta-2,5-diene.

The infrared structure of the product was consistent with an ethylene/bicyclo[2.2.1]hepta-2,5-diene copolymer having the structural formula

*TABLE I*

| Example Number | Olefin High Polymer | | | Copolymer | | | | |
|---|---|---|---|---|---|---|---|---|
| | | Melt Index | Density | Copolymer | Co-momomer, Percent | Copolymer Melt Index | Percent Copolymer In Blend | Stress Cracking, Hours to $F_{50}$ |
| Control 1 | Low density polyethylene | 2.0 | 0.92 | None | 0 | | 0 | 2 |
| 1 | ___do___ | 2.0 | 0.92 | Ethylene/Bicyclo[2.2.1]Hept-2-ene | 1 | 3.2 | 20 | 170 |
| 2 | ___do___ | 2.0 | 0.92 | ___do___ | 2.5 | 0.1 | 20 | >500 |
| 3 | ___do___ | 2.0 | 0.92 | ___do___ | 5 | 1.7 | 20 | >500 |
| 4 | ___do___ | 2.0 | 0.92 | ___do___ | 15 | 7.8 | 20 | >500 |
| 5 | ___do___ | 2.0 | 0.92 | ___do___ | 30 | 31 | 20 | >500 |
| Control 2 | High density polyethylene | 1.0 | 0.945 | None | 0 | | 0 | 1 |
| 6 | ___do___ | 1.0 | 0.945 | Ethylene/Bicyclo[2.2.1]Hept-2-ene | 2.5 | 0.1 | 20 | >500 |
| Control 3 | ___do___ | 0.6 | 0.96 | None | 0 | | 0 | 1 |
| 7 | ___do___ | 0.6 | 0.96 | Ethylene/Bicyclo[2.2.1]Hept-2-ene | 2.5 | 0.1 | 20 | >500 |
| Control 4 | Low density polyethylene | 2.0 | 0.92 | None | 0 | | 0 | 2 |
| 8 | ___do___ | 2.0 | 0.92 | Ethylene/Bicyclo[2.2.1]Hept-2-ene | 2.5 | 0.1 | 1 | 60 |
| 9 | ___do___ | 2.0 | 0.92 | ___do___ | 2.5 | 0.1 | 5 | 390 |
| 10 | ___do___ | 2.0 | 0.92 | ___do___ | 2.5 | 0.1 | 10 | >500 |
| 11 | ___do___ | 2.0 | 0.92 | ___do___ | 2.5 | 0.1 | 20 | >500 |
| 12 | ___do___ | 2.0 | 0.92 | Ethylene/Bicyclo[2.2.1]Hept-2-ene-5-Methylene | 5 | 2.4 | 20 | >500 |
| 13 | ___do___ | 2.0 | 0.92 | Ethylene/Bicyclo[2.2.1]Hepta-2,5-Diene | 5 | 1.6 | 20 | >500 |

EXAMPLE 14

Example 1 is duplicated except that polypropylenes are substituted for low density polyethylene. Similar stress crack improvements are obtained.

EXAMPLE 15

Example 1 is duplicated except that ethylene/propylene

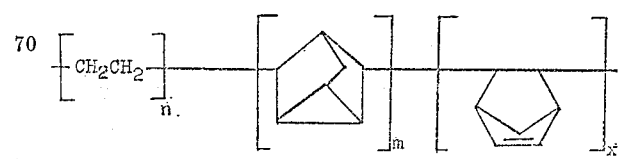

The letters $m$, $n$ and $x$ in the above formulas are integers such that the polymers are normally solid and the polymers comprise from 70 to 99 percent combined ethylene by weight.

The polymers employed in the preceding examples were prepared in the manner of Examples 17 and 18.

EXAMPLE 19

Example 1 is duplicated substituting a copolymer prepared by the method of U.S. Patent No. 2,799,668 above mentioned. Improved stress cracking properties are obtained.

What is claimed is:

1. A composition exhibiting improved stress crack resistance wherein from about 70 percent by weight to about 99 percent by weight of a high polymer of a monoolefin containing from two to ten carbon atoms inclusive having a melt index of less than about 1,000 decigrams per minute measured in accordance with ASTM 1238–57T at a temperature of about 190° C. and a pressure of about 44 pounds per square inch is in intimate admixture with from about 1 percent by weight to about 30 percent by weight of a copolymer of ethylene with a comonomer selected from the group consisting of (A) a bicycloheptene monomer having the structural formula

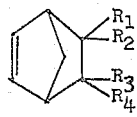

wherein $R_1$ and $R_3$ are members selected from the group consisting of hydrogen and lower alkyl groups having from 1 to 4 carbon atoms inclusive and $R_2$ and $R_4$ are members selected from the group consisting of hydrogen, lower alkyl radicals having from 1 to 4 carbon atoms inclusive and aryl radicals, and (B) a bicycloheptadiene monomer having the structural formula

wherein $R_5$ and $R_6$ are members selected from the group consisting of hydrogen, lower alkyl radicals having from 1 to 4 carbon atoms inclusive, and aryl radicals; and (C) mixtures of (A) and (B), said ethylene/bicycloheptene and ethylene/bicycloheptadiene copolymers having a melt index of less than about 1,000 decigrams per minute measured in accordance with ASTM 1238–57T at a temperature of about 190° C. and a pressure of about 44 pounds per square inch and comprising from about 70 percent by weight to about 99 percent by weight combined ethylene and from about 1 percent by weight to about 30 percent by weight of the combined comonomer.

2. The composition claimed in claim 1 wherein said olefin high polymer is polyethylene having a density of from about 0.91 to about 0.97.

3. The composition claimed in claim 2 wherein said ethylene/bicycloheptene copolymer is an ethylene/bicyclo-[2.2.1]hept-2-ene copolymer.

4. The composition claimed in claim 2 wherein said ethylene/bicycloheptene copolymer is an ethylene/bicyclo-[2.2.1]hept-2-ene-5-methylene copolymer.

5. The composition claimed in claim 2 wherein said ethylene/bicycloheptadiene copolymer is an ethylene/bicyclo[2.2.1]hepta-2,5-diene copolymer.

6. A composition exhibiting improved stress crack resistance wherein from about 80 percent by weight to about 90 percent by weight of a polyethylene having a melt index of less than about 100 decigrams per minute measured in accordance with ASTM 1238–57T at a temperature of about 190° C. and a pressure of about 44 pounds per square inch and a density of from about 0.91 to about 0.97 is in intimate admixture with from about 10 percent by weight to about 20 percent by weight of a copolymer of ethylene with a comonomer selected from the group consisting of (A) a bicycloheptene monomer having the structural formula

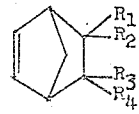

wherein $R_1$ and $R_3$ are members selected from the group consisting of hydrogen and lower alkyl groups having from 1 to 4 carbon atoms inclusive and $R_2$ and $R_4$ are members selected from the group consisting of hydrogen, lower alkyl radicals having from 1 to 4 carbon atoms inclusive, and aryl radicals, and (B) a bicycloheptadiene monomer having the structural formula

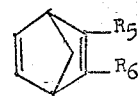

wherein $R_5$ and $R_6$ are members selected from the group consisting of hydrogen, lower alkyl radicals having from 1 to 4 carbon atoms inclusive and aryl radicals and (C) mixtures of (A) and (B), said ethylene/bicycloheptene and ethylene/bicycloheptadiene copolymers having a melt index of less than about 100 decigrams per minute measured in accordance with ASTM 1238–57T at a temperature of about 190° C. and a pressure of about 44 pounds per square inch and comprising from about 85 percent by weight to about 97.5 percent by weight combined ethylene and from about 2.5 percent by weight to about 15 percent by weight of the combined comonomer.

7. The composition claimed in claim 6 wherein said ethylene/bicycloheptene copolymer is an ethylene/bicyclo-[2.2.1]hept-2-ene copolymer.

8. The composition claimed in claim 6 wherein said ethylene/bicycloheptene copolymer is an ethylene/bicyclo-[2.2.1]hept-2-ene-5-methylene copolymer.

9. The composition claimed in claim 6 wherein said ethylene/bicycloheptadiene copolymer is an ethylene/bicyclo[2.2.1]hepta-2,5-diene copolymer.

References Cited in the file of this patent

UNITED STATES PATENTS

| | | |
|---|---|---|
| 2,799,668 | Anderson et al. | July 16, 1952 |
| 2,983,704 | Roedel | May 9, 1961 |